United States Patent Office 3,128,597
Patented Apr. 14, 1964

3,128,597
ISOLATED POLYCYCLOALKYL HYDROCARBONS AND USE AS HIGH ENERGY FUELS
John O. Smith, Swampscott, and K Warren Easley, Wayland, Mass., assignors, by mesne assignments, to Monsanto Research Corporation, Everett, Mass., a corporation of Delaware
No Drawing. Filed Oct. 19, 1960, Ser. No. 63,475
9 Claims. (Cl. 60—35.4)

This invention relates to high energy fuels. More particularly, this invention relates to methods of developing thrust and to methods of operating reaction type power plants. This invention especially contemplates a high energy fuel composition comprising an isolated polycycloalkyl hydrocarbon as an essential ingredient.

The development of reaction type power plants has been accompanied by the requirement for developing fuels suitable for use in such engines. In a reaction type power plant, fuel and an oxidizing agent are admixed under suitable conditions and in suitable proportions whereby the fuel is oxidized or burned in a pressure-restraining combustion chamber to form a mass of high temperature gases which comprise the fuel combustion products and any excess oxidizing agent. The high temperature gases are exhausted from the combustion chamber at high velocity to produce thrust in accordance with the law of momentum. In a jet propulsion type engine, such as a rocket, ram-jet, turbo-jet, or pulse-jet engine, exhaustion of the high temperature gases is directed in a rearward direction to produce a true jet propulsion. In a turbine type engine, such as a gas turbine or a turbo-prop engine, the exhaustion of high temperature gases is directed into a turbine which drives a propeller or other mechanical means for developing a forward thrust. Reaction type power plants may be used in widely different types of vehicles such as in space-ships, aircraft, boats, guided missiles, automobiles, and the like.

Heretofore, it was believed that many hydrocarbons did not vary sufficiently in burning characteristics to make a material difference in the operation of reaction type power plants. Although these power plants may be operated under many conditions with substantially any fuel, other conditions of operation encounter operational difficulties and require fuels having particular properties. One difficulty which has been encountered in power plants for high speed vehicles is that many fuels lack thermal stability, resulting in the formation of insoluble gum and other deposits which hamper performance. At high speeds, particularly supersonic speeds in aircraft, the fuel supply must serve to absorb the aerodynamic heat which builds up faster than can be dissipated to the atmosphere. A refrigeration system is not suitable in such applications because of weight and volume limitations. Under some conditions, the fuel will be heated to a temperature as high as 500° F. or higher but the presently available JP-4 fuel is thermally stable to a temperature of only about 400° F. Therefore, it is desirable to have a fuel which is thermally stable at a temperature of at least as high as 500° F.

Another serious disadvantage of the prior art fuels is the low heat of combustion of such fuels. Aircraft generally, and particularly military aircraft, are being designed for higher and higher speeds requiring higher energy level fuels. The fuel must not only have a high energy level on a weight basis, or high B.t.u./lb., but also a high energy level on a volume basis, or high B.t.u./gal., since wing sections are being made thinner in order to reduce drag and space for storage of fuel is limited. Thus, aircraft are often volume limited as well as weight limited for the storage of fuel. Aircraft are particularly volume limited using the currently available JP-6 high energy fuel which has a heat of combustion of 18,400 B.t.u./lb. on a weight basis but a heat of combustion of 119,500 B.t.u./gal. on a volume basis. Therefore it is very desirable to provide a high energy fuel having a high heat of combustion on a volume basis, preferably greater than 120,000 B.t.u./gal., and at the same time obtain the other characteristics necessary for a good fuel of this type.

An object of this invention is to provide high energy fuel compositions for use in reaction type power plants.

Another object of this invention is to provide improved methods of developing thrust.

Another object of this invention is to provide improved methods of operating reaction type power plants, particularly jet propulsion type engines, including rocket, ram-jet, turbo-jet, and pulse-jet engines, and turbine type engines, including turbo-prop and gas turbine engines.

Other aspects, objects, and advantages of this invention will be apparent from a consideration of the accompanying disclosure and the appended claims.

According to the present invention, there are provided high energy fuel compositions comprising, as an essential ingredient, an isolated polycycloalkyl hydrocarbon having at least one cycloalkyl group of a different number of carbon atoms than the remaining cycloalkyl groups.

Also, according to the present invention, there are provided improved methods of developing thrust, said methods comprising oxidizing a high energy fuel composition comprising, as an essential ingredient, an isolated polycycloalkyl hydrocarbon having at least one cycloalkyl group of a different number of carbon atoms than the remaining cycloalkyl groups with an oxidizing agent in a reaction chamber to produce a mass of high temperature gases and exhausting said gases from said reaction chamber in a manner so as to develop a large amount of thrust.

Also, according to the present invention, there are provided improved methods of operating reaction type power plants, said methods comprising injecting a stream of an oxidizing agent and a stream of a fuel composition comprising, as an essential ingredient, an isolated polycycloalkyl hydrocarbon having at least one cycloalkyl group of a different number of carbon atoms than the remaining cycloalkyl groups into the combustion chamber of said reaction type power plant in such proportion as to produce a combustible mixture, subjecting said combustible mixture to combustion, and exhausting the resulting gases from said combustion chamber so as to impart thrust thereto.

Preferably, the isolated polycycloalkyl hydrocarbons of this invention have from 2 to 7 cycloalkyl groups, none of which are condensed rings. At least one of these cycloalkyl groups has a different number of carbon atoms than the remaining cycloalkyl groups and some of the remaining cycloalkyl groups may also have different number of carbon atoms from each other. Preferably, each cycloalkyl group contains from 3 to 8 carbon atoms; however, cycloalkyl groups having a greater number of carbon atoms can also be used.

Illustrative examples of some of the isolated polycycloalkyl hydrocarbons of this invention include the following:

Cyclohexylcyclooctane
Cyclopentylcyclohexane
Cyclobutylcyclohexane
Cyclopropylcyclohexane
Cyclohexylcycloheptane
Dicyclopropylcyclohexane
1-cyclopropyl-2-cyclohexylcyclopropane
Dicyclohexylcyclooctane
Dicyclopentylcyclohexyl
Dicyclohexylcyclopentane Dicyclohexylcyclopropane
Dicyclohexylcyclobutane
Tricyclopentylcyclohexane
Tricyclohexylcycloheptane
Tricyclohexylcyclopropane
Bicyclohexylbicyclopentyl
Tricyclohexylcyclopentane
1-cyclohexyl-4-bicyclohexylcyclopentane
Tetracyclopentylcyclohexane
Tetracyclohexylcyclopropane
Tetracyclohexylcyclobutane
Tetracyclohexylcyclopentane
Tetracyclohexylcyclooctane
Pentacyclohexylcyclopentane
Hexacyclohexylcyclopentane The isolated polycycloalkyl hydrocarbons of this invention may be prepared by several different methods depending upon the number of cycloalkyl rings and the size of each ring involved in the particular hydrocarbon. For example, a bicyclic hydrocarbon such as cyclohexylcyclooctane may be prepared by reacting a cycloalkanone with a phenyl Grignard reagent to form 1-phenylcycloalkanol which is converted to the phenyl cycloalkene by heating in the presence of iodine and finally hydrogenated at elevated pressure using a nickel-supported catalyst. Another method for preparing these hydrocarbons, particularly the tricyclic hydrocarbons such as cyclopentylbicyclohexyl, comprises the Friedel-Crafts alkylation of the appropriate cycloaromatic, either benzene or biphenyl, with a suitable cycloalkylhalide followed by hydrogenation at elevated pressure. Hydrocarbons containing cyclopropyl groups can generally be prepared by the reaction wherein a carbene radical is generated from diiodomethane and a zinc-copper couple and reacted with a vinyl group. For the carbene reactions, see, e.g., the papers by W. von E. Doering et al., J. Amer. Chem. Soc., 76, 6162 (1954) and W. Kirmse, Angew. Chem. 71, 537 (1959). As defined in said Doering et al. paper, the term "carbene" bears the same relationship to "methylene" as does the term "carbinol" to "methanol" and is to be employed in the same way as "carbinol."

The advantages, desirability, and usefulness of the present invention are illustrated by the following examples:

EXAMPLE 1

In this example, 1,3,5-tricyclopentylcyclohexane was prepared from cyclopentylbromide and benzene followed by hydrogenation at elevated pressure. In the first step, a 50-l., round-bottomed reaction flask was charged with 3854 g. (28.9 moles) of anhydrous aluminum chloride and 4140 g. (27.8 moles) of cyclopentyl bromide which was added in a thin stream while stirring the reaction mixture. This reaction resulted in the copious evolution of hydrogen chloride and hydrogen bromide. After the evolution of these materials, the mixture was cooled to 0° C. and 2260 g. (28.9 moles) of anhydrous benzene was added over a 2-hour period. At the end of this time, a further 9660 g. (64.8 moles) of cyclopentyl bromide was added over a 4-hour period while maintaining the temperature at 0° C. Thereafter, hydrolysis of the reaction mixture was carried out by the addition of 316 liters of benzene followed by 7.3 liters of concentrated hydrochloric acid (36%) and 23 kilograms of crushed ice. The lower aqueous phase formed was removed from the upper organic phase and the latter was washed twice with water and then with 5% sodium bicarbonate solution until neutral to pH paper. The excess benzene was then removed by distillation at atmospheric pressure. This was followed by further distillation at reduced pressure and finally by redistillation from sodium to obtain 3685 g. of 1,3,5-tricyclopentyl benzene which is a viscous, yellow liquid boiling at 158–174° C./0.3 mm. Upon standing, this liquid slowly deposited white crystals having a melting point of 59–63° C.

In the hydrogenation step, 3635 g. (12.8 moles) of the tricyclopentyl benzene, 410 g. of catalyst comprising 65% nickel-supported on kieselguhr, and 1 liter of n-hexane were charged to a 3-gal. stirred autoclave. The hydrogenation reaction began at a temperature of 117° C. and a hydrogen pressure of 1800 p.s.i.g. Upon completion of the hydrogenation reaction, the catalyst and solvent were removed and the product was distilled under reduced pressure through a spinning band column to obtain 1924 g. of the 1,3,5-tricyclopentylcyclohexane boiling at 155° C./ 0.5 mm.–160° C./0.6 mm. Analysis of this product was found to be 87.6% carbon, and 12.4% hydrogen as compared with calculated values of 87.4% carbon and 12.6% hydrogen. The proposed structure of this compound was confirmed by inspection of the infrared spectrum of the product.

EXAMPLE 2

In this example, cyclopentylbicyclohexyl was prepared by the Friedel-Crafts alkylation of biphenyl with cyclopentyl bromide followed by hydrogenation at elevated pressure. In the first reaction step, a 50-liter round-bottomed reaction flask was charged with 4620 g. (30 moles) of biphenyl and 12 liters of cyclohexane. The mixture was stirred and cooled to 0° C. by an external Dry Ice-methanol bath before the addition of 300 g. (2.25 moles) of powdered anhydrous aluminum chloride. Thereafter, 4917 g. (33 moles) of cyclopentyl bromide was added slowly with stirring while keeping the reaction mixture at a temperature of 0° C. After this addition was complete, stirring of the solution was continued for one hour at 0° C. and then at room temperature for 12 hours. At the end of this time, the reaction mixture was transferred by siphoning into a mixture of 3750 g. of crushed ice and 3750 ml. of concentrated hydrochloric acid (36%). After stirring slowly, the lower acidic layer formed was removed by siphoning and discarded. The upper organic layer was then washed twice with water followed by washing with dilute sodium carbonate solution until the washings were no longer acidic. This was followed by drying over anhydrous calcium chloride and distillation at atmospheric pressure to remove the cyclohexane solvent. Thereafter, the product was further distilled under reduced pressure through a Vigreux column followed by further distillation from sodium to obtain 2504 g. of cyclopentylbiphenyl boiling at 162–163° C./2 mm. and having a refractive index of $n_D^{20}$ 1.6015.

In the hydrogenation step, a mixture of 2504 g. (11.3 moles) of cyclopentylbiphenyl, 251 g. of catalyst comprising 65% nickel-supported on kieselguhr, and 3100 ml. of n-hexane was charged into a 3-gal stirred autoclave. Reduction began at 130° C. and an initial hydrogen pressure of 1600 p.s.ig. Upon completion of the hydrogenation, the catalyst was removed by filtering and the solvent was removed by distillation. The product was further distilled at reduced pressure to obtain 2306 g. of the cyclopentylbicyclohexyl boiling at 116.5° C./0.6 mm.– 126° C./0.95 mm. Analysis of this product was found to be 86.7% carbon and 13.2% hydrogen as compared with calculated values of 87.1% carbon and 12.9% hydrogen.

EXAMPLE 3

In this example, cyclohexylcyclooctane was prepared in three steps from cyclooctane and phenyl Grignard reagent. In the first step, a Grignard reagent was prepared by treating 19.4 g. (0.8 mole) of magnesium and 150 ml. of anhydrous diethyl ether with 126 g. (0.8 mole) of bromobenzene in 100 ml. of anhydrous diethyl ether. Then 41.5 g. (0.33 mole) of cyclooctane was added to the Grignard reagent in 50 ml. of anhydrous diethyl ether and the reaction mixture refluxed for three hours, followed by standing overnight. Thereafter, hydrolysis of the reaction mixture was effected by washing with saturated ammonium chloride solution. The organic material obtained was extracted with diethyl ether, washed, and dried over anhydrous magnesium sulfate. The solvent was then removed by distillation to obtain 1 - phenylcyclooctanol. The 1 - phenylcyclooctanol was then converted into 1-phenylcyclooctene by heating at a temperature of 110° C. with a crystal of iodine. The water separated out was removed by the application of a vacuum and the residue distilled at reduced pressure to obtain 34 g. of the 1-phenylcyclooctene boiling at 155–162° C./21.5 mm. and having a refractive index $n_D^{20}$ 1.5635.

In the last step, the 34 g. of 1-phenylcyclooctene obtained above was hydrogenated without using a solvent in a 330 ml. bomb placed in a rocking autoclave, into which was also placed 4 g. of catalyst comprising 65% nickel, supported on kieselguhr. The reduction took place at a temperature of 215° C. and a hydrogen pressure of 1500 p.s.i. over a period of one hour. Upon completion of the hydrogenation, the product was washed from the bomb with diethyl ether, filtered from the catalyst, and distilled from sodium at reduced pressure to obtain 31 g. of cyclohexylcyclooctane boiling at 150–156° C./23 mm. This product was further purified by fractional distillation and by passage through a 3″ x ½″ column packed with silica gel to obtain a product having a boiling point of 118–119° C./5.5 mm. Analysis of the product was found to be the same as the calculated values of 86.5% carbon and 13.5% hydrogen. The proposed structure of this compound was confirmed by inspection of the infrared spectrum of the product.

EXAMPLE 4

In this example, 1,3,5-tricyclopentylcyclohexane, cyclopentylbicyclohexyl, and cyclohexylcyclooctane were subjected to inspection tests in order to show from the thermal and physical properties that these compounds are suitable for use in the operation of reaction type power plants. Results of these tests are given in Table I.

were measured using the standard Cannon-Fenske Capillary Viscosimeter following the ASTM D–445 procedure.

The luminometer numbers were obtained using a luminometer manufactured by the Erdco Engineering Corporation. The procedure for determining luminometer numbers involved burning the fuel in a luminosity lamp and measuring the temperature rise above the lamp for various luminosity readings. From a graph of luminosity readings versus lamp temperature rise, the temperature rise for a luminosity reading of 45 was obtained. The same procedure was repeated to obtain temperature rise values at a luminosity reading of 45 for isooctane and tetralin which serve as reference points of 100 and 0, respectively. The luminometer number was then obtained by dividing the difference between the temperature rise of the test fuel and the temperature rise of the tetralin by the difference in he temperature rise of isooctane and the temperature rise of tetralin multiplied by 100.

The thermal decomposition temperatures were obtained using a high temperature, high pressure isoteniscope which consists of a Monel bomb capped at one end and connected to a precision pressure gauge by a Monel diaphragm. The test fuel was heated within the bomb to an elevated temperature under high pressure and the temperature measured at which the fuel began to decompose and evolve gas as determined by the change of the pressure within the bomb. In this method, the formation of deposits in the decomposition reaction is not measured because some fuels may start to decompose to gas before forming deposits.

EXAMPLE 5

In this example, fuel specifications were determined for cyclopentylbicyclohexyl in accordance with the procedure of ASTM D–86–56. These results are reported in Table II.

*Table I*

THERMAL AND PHYSICAL PROPERTIES OF ISOLATED POLYCYCLOALKYL HYDROCARBON FUELS

|  | Fuel No. 1 | Fuel No. 2 | Fuel No. 3 |
|---|---|---|---|
| Hydrogen/carbon ratio | 0.144 | 0.148 | 0.156. |
| Luminometer number | 62.4 | 57.2 | 70.8. |
| Index of refraction, $n_D^{20}$ | 1.5042 | 1.4977 | 1.4902. |
| Boiling point, ° C | 155° C./0.5 mm | 116.5° C./0.6 mm. Hg to 126° C./0.95 mm. Hg. | 118–119° C./5.5 mm. Hg. |
| Density $d_4^{20}$ | 0.943 | 0.9260 | 0.849 a. |
| Heat of combustion, B.t.u./lb, net | 18,281 | 18,369 | 18,354. |
| Heat of combustion, B.t.u./gal, net | 144,030 | 142,729 | 139,396. |
| Viscosity at 99° C., cs | 5.75 | 3.2 | 1.95. |
| Thermal conductivity, $\frac{B.t.u.}{hr.\text{-}ft.^2 \, °F./ft.}$: |  |  |  |
| At 145.4° F | 0.692 | 0.0663 |  |
| At 219.2° F | 0.700 | 0.0634 |  |
| At 316.4° F | 0.674 | 0.0630 |  |
| Heat capacity, B.t.u./lb. ° F. at 104° F | 0.478 | 0.442 |  |
| Thermal decomposition temp., ° F | 710 | 675 | 699. |
| Freezing point, ° F | +40 to +45 | +42 | −58. | a Density measured at 99° C., gm./ml.
Fuel No. 1—1,3,5-tricyclopentylcyclohexane.
Fuel No. 2—Cyclopentylbicyclohexyl.
Fuel No. 3—Cyclohexylcyclooctane.

Heats of combustion were obtained with a Parr oxygen bomb calorimeter on both a weight and a volume basis following the ASTM D–240–57T procedure. Freezing points were determined using the ASTM D–1477–57T procedure. Specific heats were measured using a comparison calorimeter as described by Spear in Anal. Chem. 24, 938 (1952), and by Porter and Johnson in Preprints of General Papers, Division of Petroleum Chemistry, American Chemical Society, vol. 3, No. 1, 15 (1958). Thermal conductivities were measured by the hot-wire method described by Cecil and Munch in Ind. Eng. Chem. 48, 437 (1956) and Cecil, Koerner, and Munch in Ind. Eng. Chem. Data Sheets, 2, 54, (1957). Densities were determined at various temperatures using a Lipkin bicapillary pycnometer. Viscosities at various temperatures

*Table II*

DISTILLATION SPECIFICATION OF CYCLOPENTYLBICYCLOHEXYL FUEL

Distillation:
    Initial boiling point, ° F. _____ 588.2
    10% fuel evaporated, ° F. _____ 626.9
    20% fuel evaporated, ° F. _____ 631.2
    50% fuel evaporated, ° F. _____ 631.4
    90% fuel evaporated, ° F. _____ 633.2
    End point, ° F. _____ 637.7
Sum of initial boiling point and 50% fuel evaporated _____ 1219.6
Volume data:
    Residue, percent _____ 1.0
    Distillation loss, percent _____ 1.5

The above examples indicate that the isolated polycycloalkyl hydrocarbons are very suitable for use in various reaction type power plants. These particular hydrocarbons have very high heats of combustion on both a weight basis and a volume basis and may therefore be very advantageously employed in jet propulsion type engines and turbine type engines where extremely high energy content fuels are desired on either a weight basis or a volume basis. Another advantage in using the hydrocarbons of this invention in a reaction type power plant is the fact that these hydrocarbons have a very low freezing point and, therefore, can be handled satisfactorily at low temperatures.

The isolated polycycloalkyl hydrocarbons of the present invention are also characterized by unusually high thermal stabilities when employed as fuels for reaction type power plants. This factor is of importance not only in the actual combustion taking place in the engine but also in the fuel system prior to the burning step. For example, it is necessary in high speed aircraft to use the fuel reservoir to absorb the aerodynamic heat which builds up faster than can be dissipated to the atmosphere and thereby the fuel is heated to a temperature of 500° F. or higher. If degradation of the fuel occurs, gum and coke are deposited in the fuel system, thereby seriously hampering the smooth flow of fuel from the reservoir into the combustion zone.

In operating reaction type power plants with the new hydrocarbon fuels of this invention, the fuel and an oxidizing agent are admixed together to form a combustible mixture which is then ignited either by a spark ignition device or by the burning fuel itself. The fuel compositions of this invention are not limited to use with particular oxidizing agents and almost any oxidizing agent known to those skilled in the art can be used. Ordinarily, in most aircraft using turbo-prop, turbo-jet, pulse-jet and gas turbine engines, the oxidizing agent is air which is compressed either by a mechanical compressor or aerodynamically. Also, in automotive and in ship applications, the oxidizing agent will ordinarily be air. In contrast to these applications, the oxidizing agent will usually be liquid oxygen or another chemical oxidizer, for example, fuming nitric acid, hydrogen peroxide, fluorine, or the like in guided missile and rocket applications. In some applications, a mixture of oxidizing agents will also be useful.

The fuel compositions of the present invention may be blended with other materials such as gasoline, kerosene, mixtures of gasoline and kerosene, other aviation fuels, and with the presently available jet fuels to produce an improved fuel composition. More particularly, the fuels described herein may be added to the present aliphatic hydrocarbon fuels having a heat of combustion of about 112,000 B.t.u./gal. to raise the overall heat of combustion thereof to at least about 120,000 B.t.u./gal. Moreover, the fuels described herein may be used in combination with fuel additives to improve various characteristics of the fuel, including liquid viscosity, burning characteristics, and the like.

In the operation of reaction type power plants using the fuel compositions of this invention, the fuel and oxidizing agent are charged into the combustion chamber in a proportion which gives rise to a combustible mixture. Where the oxidizing agent is air, the fuel-air ratio will ordinarily be maintained between 0.005 and 0.15. The particular fuel-air ratio used will be dependent not only upon the power requirements at the moment but also upon the nature of the engine. Thus, turbo-jet engines are preferably operated on a fuel-air ratio of about 0.01 to 0.03 whereas ram-jet engines are usually operated at a fuel-air ratio of 0.03 to 0.07.

Reasonable variation and modification of the invention as described are possible the essence of which is that there have been provided (1) high energy fuel compositions containing isolated polycycloalkyl hydrocarbons as essential ingredients, (2) improved methods of developing thrust and (3) methods of operating reaction type power plants.

We claim:

1. The method of developing thrust in a reaction chamber which comprises oxidizing in said chamber a hydrocarbon fuel comprising essentially a polycycloalkyl hydrocarbon of from 9 to 41 carbon atoms, having no condensed rings, having from 2 to 7 cycloalkyl groups containing from 3 to 8 carbon atoms and consisting only of cycloalkyl groups, and wherein all of the cycloalkyl groups are not the same, to produce a mass of high temperature gases and exhausting said gases from the reaction chamber in a manner so as to develop a high thrust.

2. The method of operating a reaction type power plant which comprises injecting into the combustion chamber of said power plant a stream of an oxidizing gas and a stream of a hydrocarbon fuel comprising essentially a polycycloalkyl hydrocarbon of from 9 to 41 carbon atoms, having no condensed rings, having from 2 to 7 cycloalkyl groups containing from 3 to 8 carbon atoms and consisting only of cycloalkyl groups and wherein all of the cycloalkyl groups are not the same, oxidizing said fuel in said chamber, and exhausting the resulting gases from said chamber so as to impart thrust.

3. The method of operating a jet-propulsion engine which comprises injecting into the combustion chamber of the engine a stream of an oxidizing agent and a stream of a hydrocarbon fuel comprising essentially a polycycloalkyl hydrocarbon of from 9 to 41 carbon atoms, having no condensed rings, having from 2 to 7 cycloalkyl groups containing from 3 to 8 carbon atoms and consisting only of cycloalkyl groups, and wherein all of the cycloalkyl groups are not the same, oxidizing said fuel in said chamber, and exhausting the resulting gases in a rearward direction from said combustion chamber so as to impart thrust to said engine.

4. The method of operating a gas turbine engine which comprises injecting into the combustion chamber of the engine a stream of an oxidizing agent and a stream of a hydrocarbon fuel comprising essentially a polycycloalkyl hydrocarbon of from 9 to 41 carbon atoms, having no condensed rings, having from 2 to 7 cycloalkyl groups containing from 3 to 8 carbon atoms and consisting only of cycloalkyl groups, and wherein all of the cycloalkyl groups are not the same, oxidizing said fuel and exhausting the resulting gases from said combustion chamber through a turbine to develop motive power.

5. The method of operating a turbo-jet engine which comprises injecting into the combustion chamber of the engine a stream of air and a stream of a hydrocarbon fuel comprising essentially a polycycloalkyl hydrocarbon of from 9 to 41 carbon atoms, having no condensed rings, having from 2 to 7 cycloalkyl groups containing from 3 to 8 carbon atoms and consisting only of cycloalkyl groups, and wherein all of the cycloalkyl groups are not the same, burning the fuel in said chamber, exhausting the resulting gases from said chamber through a turbine to expand the same and compress the air supplied to said chamber, and passing the gases into the atmosphere by way of a nozzle to impart thrust to said engine.

6. The method of operating a turbo-jet engine which comprises injecting into the combustion chamber of said chamber a stream of air and a stream of a polycycloalkyl hydrocarbon of from 9 to 41 carbon atoms, having no condensed rings, having from 2 to 7 cycloalkyl groups containing from 3 to 8 carbon atoms and consisting only of cycloalkyl groups, and wherein all of the cycloalkyl groups are not the same, burning said hydrocarbon in said chamber, exhausting the resulting gases from said chamber through a turbine to expand the same and compress the air supplied to said chamber, and passing the gases into the atmosphere by way of a nozzle to impart thrust to the engine.

7. The method defined in claim 6, further limited in that the hydrocarbon is 1,3,5-tricyclopentylcyclohexane.

8. The method defined in claim 6, further limited in that the hydrocarbon is cyclopentylbicyclohexyl.

9. The method defined in claim 6, further limited in that the hydrocarbon is cyclohexylcyclooctane.

References Cited in the file of this patent

UNITED STATES PATENTS

| | | |
|---|---|---|
| 2,249,112 | Carmody | July 15, 1941 |
| 2,331,596 | Campbell | Oct. 12, 1943 |
| 2,765,617 | Gluesenkamp et al. | Oct. 9, 1956 |
| 2,826,037 | Scott et al. | Mar. 11, 1958 |

OTHER REFERENCES

Hackh's Chemical Dictionary, 3rd Ed. (1950), The Blakiston Co., Philadelphia, pages 166, 241, 454.